United States Patent [19]

Aonuma et al.

[11] Patent Number: 5,541,258
[45] Date of Patent: Jul. 30, 1996

[54] THERMOPLASTIC ELASTOMER COMPOSITION

[75] Inventors: Mitsuyoshi Aonuma, Tokyo; Kimiaki Sasamoto; Kozo Ikegami, both of Yokohama, all of Japan

[73] Assignees: Nippon Zeon Co., Ltd., Tokyo, Japan; General Electric Company, Schenectady, N.Y.

[21] Appl. No.: 543,470

[22] Filed: Oct. 16, 1995

Related U.S. Application Data

[63] Continuation of Ser. No. 178,336, filed as PCT/JP92/00921, Jul. 7, 1992 published as WO93/02143, Feb. 4, 1993, abandoned.

[30] Foreign Application Priority Data

Jul. 18, 1991 [JP] Japan ................... 3-203890

[51] Int. Cl.$^6$ ............ C08L 67/02; C08L 67/04; C08L 77/12
[52] U.S. Cl. ............ 525/166; 525/92 B; 525/92 F; 525/167; 525/173; 525/179
[58] Field of Search ............ 525/166, 167, 525/173, 92 B, 92 F, 179

[56] References Cited

U.S. PATENT DOCUMENTS

| | | | |
|---|---|---|---|
| 4,981,908 | 1/1991 | Wolfe | 525/92 |
| 5,208,292 | 5/1993 | Hert | 525/166 |
| 5,300,573 | 4/1994 | Patel | 525/109 |

FOREIGN PATENT DOCUMENTS

| | | |
|---|---|---|
| 0337976 | 10/1989 | European Pat. Off. . |
| 63-81158 | 4/1988 | Japan . |
| 63-81159 | 4/1988 | Japan . |
| 63-142056 | 6/1988 | Japan . |
| 1266154 | 10/1989 | Japan . |

*Primary Examiner*—Patricia A. Short
*Attorney, Agent, or Firm*—Armstrong, Westerman, Hattori, McLeland & Naughton

[57] ABSTRACT

A thermoplastic elastomer composition comprising (A) a thermoplastic copolyester or copolyamide elastomer, (B) an epoxy group-containing methacrylate or acrylate copolymer rubber and (C) a carboxyl group-containing methacrylate or acrylate copolymer rubber, wherein the content of component (A) is 30–90 wt. %, the total content of components (B) and (C) is 10–70 wt. %, and components (B) and (C) are crosslinked with each other. The composition provides flexible rubber articles having enhanced modulus, heat aging resistance and compression set resistance.

7 Claims, No Drawings

THERMOPLASTIC ELASTOMER COMPOSITION

This application is a continuation of application Ser. No. 08/178,336 filed Jun. 6, 1994, now abandoned, which is a 371 of PCT/JP92/00921 filed Jul. 17, 1992 published as WO93/02143, Feb. 4, 1993.

TECHNICAL FIELD

This invention relates to a thermoplastic elastomer composition which exhibits a good flexibility, a high modulus, a high heat aging resistance and a high compression set resistance.

BACKGROUND ART

Copolyester elastomers are multi-block copolymers which are mainly comprised of polyester recurring units and polyether recurring units. Copolyamide elastomers are multi-block copolymers which are mainly comprised of polyamide recurring units and polyester or polyether recurring units. Both copolyester elastomers and copolyamide elastomers have an appropriate flexibility.

However, these copolyester elastomers and copolyamide elastomers are too hard to use as an elastomer in the rubbery region, and have a poor flexibility and a poor strain recovery. To improve these properties, it is generally employed to enhance the content of soft segments in the copolymer elastomer. However, the enhancement of the soft segment content reduces the melting point which leads to narrowing of the high-temperature range at which the elastomer is usable. Instead of enhancement of the soft segment content, it has been proposed to incorporate a softening agent such as a plasticizer in the copolymer elastomers. The incorporation of a softening agent has a problem such that the incorporated softening agent tends to exude to the surface or evaporate during the use of the elastomers, which leads to restoration to the reduced flexibility.

To solve the above-mentioned problem, proposals have been made wherein a rubber is incorporated in the copolymer elastomers. For example, it has been proposed in Japanese Laid-open Patent Publication No. 1-266154 to incorporate an acrylic rubber having copolymerized therein 1 to 5% by weight of a reactive and curable monomer, in a copolyester elastomer to provide a crosslinked or uncrosslinked acrylic rubber-containing composition. The uncrosslinked composition has a poor compression set. The crosslinked composition is deteriorated especially when crosslinked with typical crosslinkers for an acrylic rubber, which are exemplified in the Japanese patent publication, such as a quaternary ammonium salt, a soap/a tertiary or quaternary amine, a red lead oxide/ethylene thiourea or a polyamine. Namely, the copolyester elastomer is degraded during milling or shaping of the composition or during the use of a shaped article, which leads to the reduction in performances of the shaped article.

In Japanese Laid-open Patent Publication (JPA) No. 1-306447, a composition is described which is comprised of a thermoplastic polyester resin such as polyethylene terephthalate or polybutylene terephthalate and an acrylic rubber crosslinked through a covalent bond. The crosslinked acrylic rubber is an acrylic rubber prepared by crosslinking a polyacrylate having an acid group, a hydroxyl group or an epoxy group as the crosslinking site with a polyamine, a polyisocyanate or a polyepoxide through a covalent bond. As the composition contains a rigid polyester resin, the content of the rubbery component must be high for imparting a satisfactory compression set to the composition, with the result of reduction in fluidity of the composition in the step of shaping.

Although a rubber composition comprising a polyetherester elastomer and an ethylene-acrylate copolymer rubber crosslinked with an isocyanate compound is described as one example of the composition in JPA 1-306447, this reference is silent on crosslinking system of an epoxy group in a rubber composition of a copolyester elastomer and an epoxy group-containing methacrylate or acrylate copolymer rubber.

As suggested in the above-described references, crosslinked rubber compositions comprising a copolyester elastomer having an acrylic rubber crosslinked and dispersed in the compositions exhibit improved flexibility and compression set resistance. But, a satisfactory crosslinking system of an acrylic rubber in a copolyester elastomer has not been found in the crosslinked rubber compositions. Especially, a problem arises in that a copolyester elastomer tends to be readily deteriorated in a molten state by a crosslinker usually used for an acrylic rubber.

DISCLOSURE OF THE INVENTION

An object of the present invention is to provide a thermoplastic elastomer composition exhibiting a good flexibility, a high modulus, a high heat aging resistance and a high compression set resistance, which comprises a copolyester elastomer or a copolyamide elastomer, an epoxy group-containing methacrylate or acrylate copolymer rubber and a carboxyl group-containing methacrylate or acrylate copolymer rubber, and wherein the epoxy group-containing methacrylate or acrylate copolymer rubber and the carboxyl group-containing methacrylate or acrylate copolymer rubber are crosslinked with each other and dispersed in the composition without deterioration of the copolyester and copolyamide elastomers and the entire composition.

The object of the present invention is achieved by a thermoplastic elastomer composition comprising (A) a thermoplastic copolyester elastomer or a thermoplastic copolyamide elastomer, (B) a methacrylate or acrylate copolymer rubber containing an epoxy group, and (C) a methacrylate or acrylate copolymer rubber containing a carboxyl group; the amount of component (A) being 30 to 90% by weight, the total amount of component (B) and component (C) being 10 to 70% by weight, and component (B) and component (C) being crosslinked with each other.

The object of the present invention is more successfully achieved in the case where at least one of the following requirements is satisfied.

(i) the thermoplastic copolyester elastomer is at least one member selected from a copolyetherester elastomer, a polylactone-modified or lactone-modified copolyetherester elastomer and a copolyetherimideester elastomer.

(ii) the thermoplastic copolyamide elastomer is at least one member selected from a copolyetheresteramide elastomer and a copolyesteramide elastomer.

(iii) the epoxy group-containing methacrylate or acrylate copolymer rubber contains, as the epoxy group, units derived from at least one monomer containing an epoxy group selected from glycidyl methacrylate, glycidyl acrylate and allyl glycidyl ether.

(iv) the carboxyl group-containing methacrylate or acrylate copolymer rubber contains, as the carboxyl group, units derived from methacrylic acid or acrylic acid.

(v) the epoxy group-containing methacrylate or acrylate copolymer rubber and the carboxyl group-containing methacrylate or acrylate copolymer rubber are mixed together with the thermoplastic copolyester elastomer or thermoplastic copolyamide elastomer and are crosslinked with each other in a molten state.

BEST MODE FOR CARRYING OUT THE INVENTION

The composition of the invention comprises 30 to 90% by weight, preferably 40 to 80% by weight, of a thermoplastic copolyester elastomer or a thermoplastic copolyamide elastomer, and 70 to 10% by weight, preferably 60 to 20% by weight, of an epoxy group-containing methacrylate or acrylate copolymer rubber plus a carboxyl group-containing methacrylate or acrylate copolymer rubber, and is characterized in that the epoxy group-containing methacrylate or acrylate copolymer rubber and the carboxyl group-containing methacrylate or acrylate copolymer rubber are crosslinked with each other and dispersed in the composition. If the amount of the thermoplastic copolyester or copolyamide elastomer is smaller than the above-mentioned range and the total amount of the two kinds of methacrylate or acrylate copolymer rubbers is larger than the above-mentioned range, the proccessability of the composition is reduced. In contrast, if the amount of the thermoplastic copolyester or copolyamide elastomer is larger than the above-mentioned range and the total amount of tile two kinds of methacrylate or acrylate copolymer rubbers is smaller than the above-mentioned range, a rubber elasticity-imparting effect cannot be obtained.

As the thermoplastic copolyester elastomer used in the invention, there can be mentioned random and multi-block copolyesters which are comprised of polyester and polyether recurring units; polyester, polylactone (or lactone) and polyether recurring units; or polyester and polyimide-ether recurring units. Such random and multi-block copolyesters include copolyetherester elastomers, polylactone-modified or lactone-modified copolyetherester elastomers, and copolyetherimide elastomers.

Suitable thermoplastic copolyetherester elastomers and polylactone-modified or lactone-modified copolyetherester elastomers are produced by a conventional esterification and polycondensation process from (i) at least one diol, (ii) at least one dicarboxylic acid, (iii) at least one long chain ether-glycol, and optionally (iv) at least one lactone or polylactone.

The diol (i) used for the production of tile copolyetherester elastomers and their polylactone- or lactone-modified products includes saturated and unsaturated aliphatic, alicyclic and aromatic dihydroxy compounds. These diols preferably have a low molecular weight, i.e., a molecular weight of not higher than about 300. As typical examples of the aliphatic and alicyclic diols, there can be mentioned aliphatic and alicyclic diols having 2 to 15 carbon atoms such as ethylene glycol, propanediol, butanediol, pentanediol, 2-methylpropanediol, 2,2-dimethylpropanediol, hexanediol, decanediol, 2-octylundecanediol, 1,2-, 1,3- and 1,4-dihydroxycyclohexane, 1,2-, 1,3- and 1,4-cyclohexanedimethanol, butanediol and hexanediol. Of these, 1,4-butanediol and a mixture of 1,4-butanediol with hexanediol or butanediol are preferable. As typical examples of the aromatic diols, there can be mentioned aromatic diols having 6 to 19 carbon atoms such as resorcinol, hydroquinone, 1,5-dihydroxynaphthalene, 4,4'-dihydroxydiphenyl, bis(p-hydroxyphenyl)methane and 2,2-bis-(p-hydroxyphenyl)propane.

Especially preferable diols are saturated aliphatic diols having 2 to 8 carbon atoms, and a mixture of such saturated aliphatic diols and a mixture of such saturated aliphatic diol and an unsaturated diol. In the case where two or more kinds of diols are used, preferably the same diol occupies at least about 50% by mole, more preferably at least 80% by mole, of the total amount of the diols. A most preferable diol mixture comprises at least 50% by mole of 1,4-butanediol.

The dicarboxylic acid (ii) used for the production of the copolyetherester elastomers and their polylactone- or lactone-modified products includes aliphatic, alicyclic and aromatic dicarboxylic acids. These dicarboxylic acids preferably have a low molecular weight, i.e., a molecular weight of not larger than about 350, but a carboxylic acid having a higher molecular weight such as a dimer acid can be used.

As typical examples of the aliphatic and alicyclic dicarboxylic acids, there can be mentioned sebacic acid, 1,2-cyclohexanedicarboxylic acid, 1,3-cyclohexanedicarboxylic acid, 1,4-cyclohexanedicarboxylic acid, adipic acid, glutaric acid, succinic acid, oxalic acid, azelaic acid, diethylmalonic acid, allylmalonic acid, 4-cyclohexene-1,2-dicarboxylic acid, 2-ethylsuberic acid, tetramethylsuccinic acid, cyclohexanedicarboxylic acid, decahydro-1,5-naphthalenedicarboxylic acid, 4,4'-bicyclohexyldicarboxylic acid, decahydro-2,6-naphthalenedicarboxylic acid, 4,4'-methylenebis(cyclohexane-carboxylic acid), 3,4-furandicarboxylic acid and 1,1-cyclobutanedicarboxylic acid, and dimer acids of these dicarboxylic acids. Of these, cyclohexanedicarboxylic acid, sebacic acid, glutaric acid and adipic acid are preferable.

As typical examples of the aromatic dicarboxylic acids, there can be mentioned terephthalic acid, phthalic acid, isophthalic acid, bi-benzoic acids, substituted dicarboxyl compounds having two benzene nuclei such as bis-(p-carboxyphenyl)methane, oxybis(benzoic acid) and ethylene-1,2-bis(p-oxybenzoic acid); and 1,5-naphthalenedicarboxylic acid, 2,6-naphthalenedicarboxylic acid, 2,7-naphthalenedicarboxylic acid, phenanthrenedicarboxylic acid, anthracenedicarboxylic acid, 4,4'-sulfonyl-dibenzoic acid, and these derivatives having a substituent such as halo, or an alkyl, alkoxy or aryl group having 1 to 12 carbon atoms. Provided that the object of the invention can be achieved, these aromatic dicarboxylic acids can be used in combination with an aromatic carboxylic acid such as a hydroxy-acid, e.g., p-(β-hydroxyethoxy)benzoic acid.

Among the dicarboxylic acids used for the production of the copolyetherester elastomers and their polylactone-modified or lactone-modified products, an aromatic dicarboxylic acid, a mixture of two or more aromatic dicarboxylic acids and a mixture of an aromatic dicarboxylic acid and an aliphatic and/or alicyclic dicarboxylic acid are preferable. An aromatic dicarboxylic acid alone is especially preferable. Among the aromatic dicarboxylic acids, those which have 8 to 16 carbon atoms, especially benzenedicarboxylic acids such as phthalic acid, terephthalic acid and isophthalic acid and dimethyl esters thereof are more preferable. Dimethyl terephthalate is most preferable.

Where a mixture of dicarboxylic acids or esters thereof is used, preferably the same dicarboxylic acid occupies at least about 60% by mole, more preferably at least about 80% by mole, of tile total amount of the dicarboxylic acids. An optimum mixture comprises at least about 60% by mole of dimethyl terephthalate based on the dicarboxylic acid mixture.

The long chain ether glycol (iii) used for the production of the thermoplastic copolyetherester elastomer and their polylactone- or lactone-modified products is preferably selected from a poly(oxyalkylene) glycol and a copoly(oxyalkylene) glycol, which have a molecular weight of about 400 to about 12,000. Preferable poly(oxyalkylene) units are derived from long chain ether glycols which have a molecular weight of about 900 to about 4,000, and the main chain of which have a carbon/oxygen ratio of about 1.8 to about 4.3.

As typical examples of the poly(oxyalkylene) glycols and the copoly(oxyalkylene) glycols, there can be mentioned poly(ethylene-ether) glycol, poly(propylene-ether) glycol, poly(tetramethylene-ether) glycol, poly(propylene-ether) glycol which is end-capped with ethylene oxide, a random or block copolymer of ethylene oxide and propylene oxide such as a copoly(propylene-ether-ethylene-ether) glycol comprising a predominant amount of the poly(ethylene-ether) backbone, and a random or block copolymer of tetrahydrofuran and a minor amount of a comonomer such as ethylene oxide, propylene oxide or methyltetrahydrofuran (the amount of the comonomer is such that the carbon/oxygen ratio does not exceed about 4.3). A polyformal glycol produced by the reaction of formaldehyde with a diol such as 1,4-butanediol or 1,5-pentanediol is also useful. Preferable poly(oxyalkylene) glycols or copoly(oxyalkylene) glycols are poly(propylene-ether) glycol, poly(tetramethylene-ether) glycol, and a copoly(propylene-etherethylene-ether) glycol comprising a predominant amount of poly(ethylene-ether) backbone.

If desired, one or more lactones or polylactones (iv) can be used for the production of the copolyetherester elastomers. The polylactone-modified or lactone-modified copolyetherester elastomers are described in U.S. Pat. No. 4,569,973.

As the lactone (iv) used in the invention, ε-caprolactone is especially preferable, but substituted lactones having a lower alkyl substituent such as a methyl group or an ethyl group in the α, β, γ, δ or ε position can be used. Further, as block units of the copolyetherester elastomers used in the invention, a polylactone can be used which includes a homopolymer of a lactone, a copolymer of a lactone with other copolymerizable monomer, and a hydroxyl-terminated polylactone.

In general, preferable copolyesterether elastomers and polylactone-modified or lactone-modified products comprise about 5% to about 80% by weight, more preferably about 10% to about 50% by weight, of the long chain ether glycol (iii) or the long chain ether glycol (iii) plus the lactone (iv).

The polyetherimideester elastomer used in the invention can be produced from one or more kinds of diols, one or more kinds of dicarboxylic acids and one or more kinds of high-molecular-weight polyoxyalkylenediimide diacid. The production of the polyoxyalkylenediimide diacid is described in U.S. Pat. No. 4,556,705.

The polyetherimideester elastomer used in the invention can be produced by a conventional process for producing polyesters, for example, an esterification and condensation process for producing a random or block copolymer. Thus, the polyetherimideester elastomer is characterized as a reaction product of a diol with an acid.

Preferable polyetherimideester elastomers used in the invention can be produced from (i) one or more kinds of aliphatic or alicyclic diols having 2 to 15 carbon atoms, (ii) one or more kinds of aliphatic, alicyclic or aromatic dicarboxylic acids or ester derivatives thereof, and (iii) one or more kinds of polyoxyalkylenediimide diacids. The amount of the polyoxyalkylenediimide diacid used may be varied depending upon the desired properties of the resulting polyetherimideester elastomer. In general, the weight ratio of the polyoxyalkylenediimide diacid (iii)/the dicarboxylic acid (ii) is in the range of about 0.25 to about 2.0, preferably about 0.4 to about 1.4.

The diol (i) used for the production of the polyetherimideester includes saturated and unsaturated aliphatic and alicyclic dihydroxy compounds and aromatic dihydroxy compounds. The diol (i) preferably has a low molecular weight, i.e., a molecular weight of about 250 or lower.

A preferable diol is selected from saturated aliphatic diols and their mixtures, and mixtures of one or more kinds of saturated aliphatic diols and one or more kinds of unsaturated aliphatic diols (each of the diols has 2 to 8 carbon atoms). In the case where two or more kinds of diols are used, preferably the same diol occupies at least about 60% by mole, more preferably at least 80% by mole, based on the total of the diols. More preferable diols are 1,4-butanediol and a mixture predominantly comprised of 1,4-butanediol. Of these, 1,4-butanediol alone is the most preferable.

The dicarboxylic acid (ii) used for the production of the polyetherimideester is selected from aliphatic, alicyclic and aromatic dicarboxylic acids and ester derivatives thereof. Preferable dicarboxylic acids have a molecular weight of lower than about 300 or have 4 to 18 carbon atoms. But, dicarboxylic acids having a higher molecular weight, especially dimer acids, can also be used.

Among the aliphatic, alicyclic and aromatic dicarboxylic acids used for the production of the polyetherimideester, aromatic dicarboxylic acids, a mixture of two or more aromatic dicarboxylic acids and a mixture of an aromatic dicarboxylic acid and an aliphatic and/or alicyclic dicarboxylic acid are preferable. Of these, an aromatic dicarboxylic acid alone is more preferable. Among the aromatic dicarboxylic acids, those which have 8 to 16 carbon atoms, especially benzenedicarboxylic acids such as phthalic acid, terephthalic acid and isophthalic acid, and dimethyl esters thereof are more preferable. Dimethyl terephthalate is most preferable.

The polyoxyalkylenediimide diacid (iii) used for the production of the polyetherimideester is a diacid having an average molecular weight larger than about 700, preferably larger than about 900. The diacid (iii) can be produced by imitating one or more kinds of tricarboxylic acid compounds with a high-molecular-weight polyoxyalkylene diamine, which tricarboxylic acids have two adjacent carboxyl groups or an acid anhydride group and another carboxyl group which is capable of being esterified and is preferably incapable of being imitated.

In general, the polyoxyalkylenediimide diacid useful for the production of the polyetherimideester is represented by the following formula:

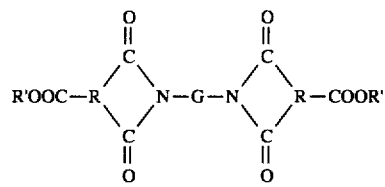

wherein Rs may be tile same or different and represent a trivalent organic radical, preferably an aliphatic, alicyclic or aromatic trivalent radical having 2 to 20 carbon atoms, R's may be the same or different and represent hydrogen or a univalent organic radical, preferably an aliphatic or alicyclic univalent radical having 1 to 8 carbon atoms or an aromatic univalent radical having 6 to 12 carbon atoms, for example, a phenyl group. Hydrogen is most preferable as R'. G is a residue which is obtainable by removing hydroxyl groups from both end positions or positions in close vicinity to both ends of a long chain ether glycol having an average molecular weight of about 600 to about 12,000, preferably of about 900 to about 4,000 and a carbon/oxygen ratio of about 1.8 to about 4.3.

The polyoxyalkylene diamine used for the production of the polyoxyalkylenediimide diacid is produced from a long chain ether glycol. As typical examples of the long chain ether glycol, there can be mentioned poly(ethylene-ether) glycol, poly(propylene-ether) glycol, poly(tetramethyleneether) glycol, random or block copolymers of ethylene oxide and propylene oxide, e.g., propylene oxide-terminated poly(ethylene-ether) glycol; and random or block copolymers of tetrahydrofuran (the amount of tetrahydrofuran is such that the carbon/oxygen molar ratio in the glycol does not exceed about 4.3) and a small amount of a comonomer such as methyltetrahydrofuran. Preferable poly(alkylene-ether) glycols are poly(ethylene-ether) glycol, poly(propylene-ether) glycol and propylene oxide-terminated poly(ethylene-ether) glycol.

In general, preferable polyoxyalkylenediamines have an average molecular weight of about 500 to about 12,000, more preferably of about 900 to about 4,000.

The tricarboxylic acid compounds used for the production of the polyoxyalkylenediimide diacid can be a corresponding acid which contains a carboxylic acid anhydride group or two adjacent imide-forming carboxyl groups instead of the carboxylic acid anhydride group, and an additional carboxyl group. These acids may be either alone or a mixture. The additional carboxyl group must be capable of being esterified and is preferably substantially incapable of being imidated.

The tricarboxylic acids can be represented by the following formula:

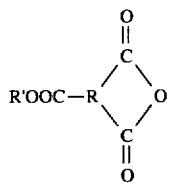

wherein Rs may be the same or different and are trivalent organic radicals, preferably aliphatic, alicyclic or aromatic trivalent organic radicals having 2 to 20 carbon atoms, R's may be the same or different and are hydrogen or univalent organic radicals, preferably aliphatic or alicyclic univalent organic radical having 1 to 8 carbon atoms or aromatic univalent organic radical having 6 to 12 carbon atoms, e.g., phenyl. Hydrogen is most preferable as R'. The most preferable tricarboxylic acid compound is trimellitic anhydride.

The amounts of the components used for the production of the polyetherimideester are not particularly limited, but preferably the amount of diol (i) is at least equimolar to, more preferably larger than the equimolar amount to, and most preferably at least 150% of the total mole number of dicarboxylic acid (ii) and polyoxyalkylenediimide diacid (iii). By using such an excessive amount of diol (i) to the sum of the acid components (ii) and (iii), the loss of diol (i) occurring during esterification and condensation is compensated, and the polyetherimideester is obtained in a highest yield.

The proportion of dicarboxylic acid (ii) to polyoxyalkylenediimide diacid (iii) also is not particularly limited, but preferably the (ii)/(iii) proportion is in the range of about 0.25 to about 2, more preferably about 0.4 to about 1.4. The optimum (ii)/(iii) proportion varies depending upon the particular polyoxyalkylenediimide diacid used and the desired physical and chemical properties of the polyetherimideester produced. In general, the lower the weight ratio of polyoxyalkylenediimide diacid (iii)/dicarboxylic acid (ii), the higher the strength, crystallinity and resistance to deflection under heat of the resulting polymer. In contrast, the higher the weight ratio of (iii)/(ii), the higher the flexibility, tension set and low-temperature impact resistance of the resulting polymer.

Preferable polyetherimideesters used in the invention are a reaction product of (i) 1,4-butanediol which may optionally contain up to 40% by mole of other saturated or unsaturated aliphatic or alicyclic diol, (ii) dimethyl terephthalate which may optionally contain up to 40% by mole of other dicarboxylic acid compound, and (iii) a polyoxyalkylenediimide diacid prepared from a polyoxyalkylenediamine having a molecular weight of about 600 to about 12,000, preferably of about 900 to about 4,000 and trimellitic anhydride. The most preferable polyetherimideester is a reaction product of (i) 1,4-butanediol alone as the diol, (ii) dimethyl terephthalate alone as the dicarboxylic acid, and (iii) the above-mentioned polyoxyalkylenediimide diacid.

The thermoplastic copolyamide elastomer used in the invention are classified into a copolyesteramide elastomer which is a random or multi-block copolymer comprised of polyester recurring units and polyamide recurring units, and a copolyetheresteramide elastomer which is a random or multi-block copolymer comprised of polyetherester recurring units and polyamide recurring units.

The copolyesteramide elastomer used in the invention is obtained by reacting (1) at least one polyamide-forming compound selected from (a) an amino carboxylic acid having 6 to 12 carbon atoms, (b) a lactam having 6 to 12 carbon atoms, and (c) a nylon salt prepared from a dicarboxylic acid having 4 to 12 carbon atoms and a diamine having 4 to 12 carbon atoms, (2) a dicarboxylic acid having 4 to 54 carbon atoms, and (3) a polycaprolactone-polyol.

As the dicarboxylic acid having 6 to 12 carbon atoms, there can be mentioned 6-amino-caproic acid, 7-amino-caprylic acid, 8-amino-capric acid, ω-aminoenanthic acid, ω-amino-pelargonic acid, 11-amino-undecanoic acid and 12-aminododecanoic acid. Of these, 6-amino-caproic acid, 11-aminoundecanoic acid and 12-amino-dodedcanoic acid are preferable. As the lactam having 6 to 12 carbon atoms, there can be mentioned caprolactam, enantolactam, caprylic lactam and lauryl lactam. Of these, caprolactam and lauryl lactam are preferable.

As the nylon salt prepared from a dicarboxylic acid having 4 to 12 carbon atoms and a diamine having 4 to 12 carbon atoms, there can be mentioned a salt of adipic acid with hexamethylenediamine, a salt of sebacic acid with hexamethylenediamine, a salt of isophthalic acid with hexamethylenediamine and a salt of terephthalic acid with trimethylhexamethylenediamine.

As the dicarboxylic acid having 4 to 54 carbon atoms, there can be mentioned aromatic dicarboxylic acids such as phthalic acid, isophthalic acid, terephthalic acid, naphthalene-2,6-dicarboxylic acid, naphthalene-2,7-dicarboxylic acid, diphenyl-4,4'-dicarboxylic acid and diphenoxyethane-dicarboxylic acid; alicyclic dicarboxylic acids such as 1,4-cyclohexane-dicarboxylic acid, 1,2-cyclohexanedicarboxylic acid and dicyclohexyl-4,4'-dicarboxylic acid; aliphatic dicarboxylic acids such as succinic acid, oxalic acid, adipic acid, sebacic acid and dodecanoic acid; and dimer acids of these acids. Of these, terephthalic acid, isophthalic acid, 1,4-cyclohexanedicarboxylic acid, adipic acid, sebacic acid, dodecanoic acid, and their dimer acids are preferable.

The polycaprolactone-polyol used together with the polyamide-forming compound and the dicarboxylic acid for the production of the copolyesteramide elastomer preferably has an average molecular weight of 200 to 10,000. If the molecular weight of the polycaprolactone-polyol is larger than 10,000, a problem arises due to the inherent properties of the polycaprolactone-polyol. One preferable example of the polycaprolactone-polyol is a mixture of 70 to 99.9% by weight of polycaprolactone-diol having an average molecular weight of 200 to 10,000 and 0.1 to 30% by weight of polycaprolactonepolyol with at least three functional groups having an average molecular weight of 200 to 10,000. If the proportion of the polycaprolactone-polyol with at least three functional groups is smaller than 0.1% by weight, the beneficial results of this compound are not obtained. In contrast, if the proportion of this compound exceeds 30% by weight, the reaction mixture is liable to be gelled during production.

The above-mentioned copolyesteramide elastomer is produced by the reaction of an initiator, ε-caprolactone or 6-hydroxycaproic acid, a polyamide-forming compound and a dicarboxylic acid. The producing process includes the following processes (A) through (D).

(A) ε-caprolactone is ring-opened and added to an initiator to give a polycaprolactone-diol, and the polycaprolactone-diol, a polyamide-forming compound and a dicarboxylic acid are subjected to a polycondensation reaction.

(B) A polyamide-forming compound is reacted with a dicarboxylic acid to give a dicarboxylic acid polyamide, and the dicarboxylic acid polyamide and the polycaprolactonediol prepared in the process (A) are subjected to a polycondensation.

(C) The dicarboxylic acid polyamide prepared in the process (B), an initiator and ε-caprolactone are subjected to a ring-opening polycondensation.

(D) An initiator, ε-caprolactone, a polyamide-forming compound and a dicarboxylic acid are subjected to a ring-opening polycondensation.

Instead of the polycaprolactone-diol, a polycaprolactone-polyol may be used.

As the initiator, there can be mentioned, for example, diols represented by the following formula:

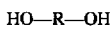

HO—R—OH wherein R is an aromatic hydrocarbon group having 1 or 2 aromatic rings, an alicyclic hydrocarbon group having 4 to 37 carbon atoms, a saturated or unsaturated aliphatic group having 1 to 30 carbon atoms, a polyester-polyol residue having an average molecular weight of 200 to 6,000 or a polyalkylene glycol residue having an average molecular weight of 200 to 6,000.

The copolyetheresteramide elastomer used in the invention is synthesized by a condensation reaction between a polyether having hydroxyl groups at the ends of the main chain and a polyamide. As the polyether having hydroxyl groups at the ends of the main chain, there can be mentioned linear or branched polyoxyalkylene glycols, e.g., polyoxyethylene glycol, polyoxypropylene glycol, polyoxytetramethylene glycol or a mixture thereof, and copolyethers derived from these compounds. The polyethers generally have an average molecular weight of 200 to 6,000, preferably 400 to 3,000. The amount of polyoxyalkylene glycol is usually in the range of 5 to 85% by weight, preferably 10 to 50% by weight, based on the total weight of the copolyetheresteramide elastomer.

As the polyamide used for the synthesis of the copolyetheresteramide elastomer, there can be mentioned those which are made from a lactam or amino acid with a hydrocarbon chain having 4 to 14 carbon atoms, for example, caprolactam, enantholactam, dodecalactam, undecanolactam, dedecanolactam, 11-amino-undecanoic acid or 12-aminododecanoic acid, or a condensation product of a dicarboxylic acid with a diamine, for example, nylon 6-6, 6-9, 6-10, 6-12 or 9-6, namely, a condensation product of adipic acid, azelaic acid, sebacic acid or 1,12-dodecanediacid with hexamethylenediamine or a condensation product of adipic acid with nonamethylenediamine.

A diacid used as a chain stopper in the synthesis of a polyamide enables the formation of a polyamide having carboxyl groups at the terminals. As the diacid, there can be mentioned dicarboxylic acids such as aliphatic dicarboxylic acids having 4 to 20 carbon atoms, for example, succinic acid, adipic acid, suberic acid, azelaic acid, sebacic acid, undecane-diacid and dodecane-diacid. Alicyclic or aromatic diacids also can be used.

These diacids are used in an amount exceeding the amount which is calculated according to the conventional procedure used in the current polycondensation reaction as the amount required for obtaining a polyamide having a desired average molecular weight. The dicarboxylic acid polyamides usually have an average molecular weight of 300 to 15,000, preferably 800 to 5,000.

The polycondensation reaction for the production of the copolyetheresteramide elastomer is carried out in the presence of a catalyst under a reduced pressure of about 0.05 to 5 mmHg at a temperature higher than the melting points of the reaction components used while the reaction components are stirred. The reaction temperature is selected so that the reaction components are maintained in a fluid state. The reaction temperature is usually 100° to 400° C., preferably 200° to 300° C.

The reaction time varies depending upon the particular polyoxyalkylene glycol and is usually in the range from 10 minutes to 10 hours, preferably from 1 to 7 hours. The reaction time should be long enough for obtaining a product with a viscosity giving the desired properties required for a moldable and/or extrudable plastic material.

The carboxylic acid groups and the hydroxyl groups in the reaction components must be substantially equimolar to each other so that the polycondensation reaction occurs in optimum conditions to give the desired product.

The epoxy group-containing methacrylate or acrylate copolymer rubber and the carboxyl group-containing methacrylate or acrylate copolymer rubber, which are used in the invention, are methacrylate or acrylate copolymer rubbers which have a backbone comprised of (1) units derived from an alkyl ester of methacrylic acid or acrylic acid and/or an alkoxy-substituted alkyl ester of methacrylic acid or acrylic acid, (2) units derived from an epoxy group-containing ethylenically unsaturated monomer and a carboxyl group-containing ethylenically unsaturated monomer as reactive groups, and if desired (3) units of other ethylenically unsaturated monomers copolymerizable with these components (1) and (2).

Alkyl esters of methacrylic acid and acrylic acid (1) used for the production of the epoxy group-containing methacrylate or acrylate copolymer rubber and the carboxyl group-containing methacrylate or acrylate copolymer rubber are represented by the following formula:

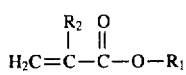

wherein $R_1$ is an alkyl group having 1 to 18 carbon atoms and $R_2$ is hydrogen or a methyl group. As specific examples of the alkyl methacrylate and alkyl acrylate, there can be mentioned methyl methacrylate, methyl acrylate, ethyl methacrylate, ethyl acrylate, n-propyl methacrylate, n-propyl acrylate, n-butyl methacrylate, n-butyl acrylate, isobutyl methacrylate, isobutyl acrylate, n-pentyl methacrylate, n-pentyl acrylate, isoamyl methacrylate, isoamyl acrylate, n-hexyl methacrylate, n-hexyl acrylate, 2-methylpentyl methacrylate, 2-methylpentyl acrylate, n-octyl methacrylate, n-octyl acrylate, 2-ethylhexyl methacrylate, 2-ethylhexyl acrylate, n-decyl methacrylate, n-decyl acrylate, n-dodecyl methacrylate, n-dodecyl acrylate, n-octadecyl methacrylate and n-octadecyl methacrylate. Of these, ethyl methacrylate, ethyl acrylate, n-propyl methacrylate, n-propyl acrylate, n-butyl methacrylate, n-butyl acrylate, n-pentyl methacrylate, n-pentyl acrylate, n-hexyl methacrylate, n-hexyl acrylate, 2-ethylhexyl methacrylate, 2-ethylhexyl acrylate, n-octyl methacrylate and n-octyl acrylate are preferable.

Alkoxy-substituted alkyl esters of methacrylic acid and acrylic acid are represented by the following formula:

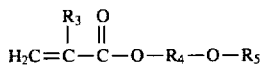

wherein $R_3$ is hydrogen or a methyl group, $R_4$ is an alkylene group having 1 to 18 carbon atoms and $R_5$ is an alkyl group having 1 to 18 carbon atoms. As specific examples of the alkoxy-substituted alkyl esters of methacrylic acid and acrylic acid, there can be mentioned 2-methoxyethyl methacrylate, 2-methoxyethyl acrylate, 2-ethoxyethyl methacrylate, 2-ethoxyethyl acrylate, 2-(n-propoxy)ethyl methacrylate, 2-(n-propoxy)ethyl acrylate, 2-(n-butoxy)ethyl methacrylate, 2-(n-butoxy)ethyl acrylate, 3-methoxypropyl methacrylate, 3-methoxypropyl acrylate, 3-ethoxypropyl methacrylate, 3-ethoxypropyl acrylate, 2-(n-propoxy)propyl methacrylate, 2-(n-propoxy)propyl acrylate, 2-(n-butoxy)propyl methacrylate and 2-(n-butoxy)propyl acrylate.

As specific examples of the epoxy group-containing ethylenically unsaturated monomer used for the production of the epoxy group-containing methacrylate or acrylate copolymer rubber, there can be mentioned allyl glycidyl ether, glycidyl methacrylate, glycidyl acrylate, and compounds represented by the following formula (in each formula, $R_6$ represents hydrogen or a methyl group).

3,4-Epoxyhexahydrobenzyl methacrylate or 3,4-epoxyhexahydrobenzyl acrylate

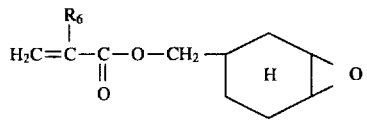

4-Glycidyloxy-3,5-dimethylbenzyl methacrylate or 4-glycidyloxy-3,5-dimethylbenzyl acrylate

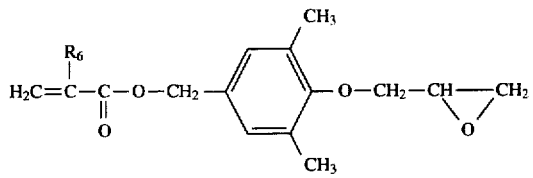

2-(4'-Glycidyloxyphenyl)-2-[4'-methacryloxyethyloxyphenyl]propane or 2-(4'-glycidyloxyphenyl)-2-[4'-acryloxyethyloxyphenyl]propane

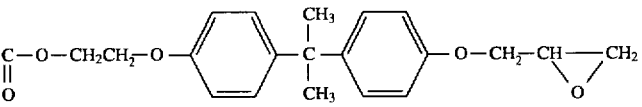

Glycidyl 2-methacryloyloxyethylsuccinate or glycidyl 2-acryloyloxyethylsuccinate

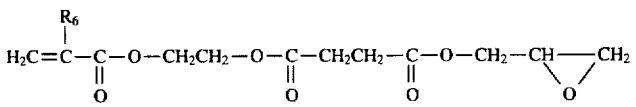

Glycidyl 2-methacryloyloxyethylphthalate or glycidyl 2-acryloyloxyethylphthalate

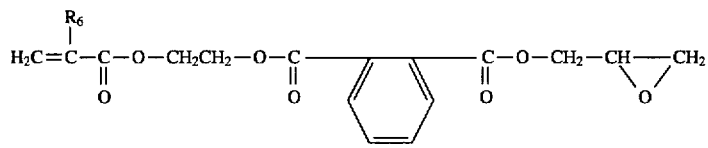

Glycidyl 2-methacryloyloxyethylhexahydrophthalate or glycidyl 2-acryloyloxyethylhexahydrophthalate

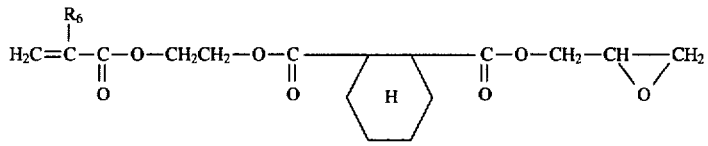

Glycidyl 2-methacryloyloxyethylterephthalate or glycidyl 2-acryloyloxyethylterephthalate

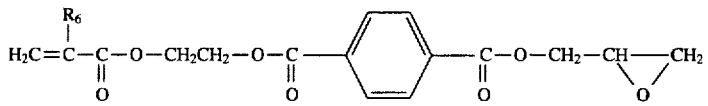

Glycidyl 2-methacryloyloxyethylhexahydroterephthalate or glycidyl 2-acryloyloxyethylhexahydroterephthalate

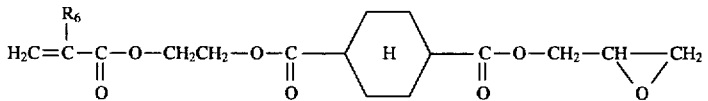

3,4-Epoxyhexahydrobenzylmethacrylamide or 3,4-epoxyhexahydrobenzylacrylamide

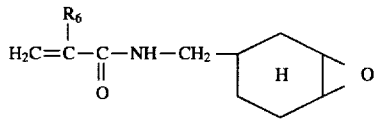

4-Glycidyloxy-3,5-dimethylbenzylmethacrylamide or 4-glycidyloxy-3,5-dimethylbenzylacrylamide

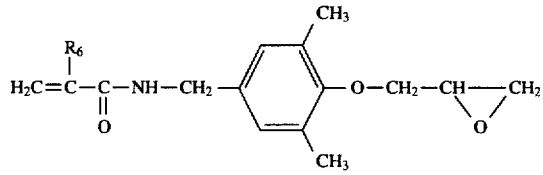

As specific examples of the carboxyl group-containing ethylenically unsaturated monomer used for the production of the carboxyl group-containing methacrylate or acrylate copolymer rubber used in the invention, there can be mentioned acrylic acid, methacrylic acid, crotonic acid, 2-pentenoic acid, maleic acid, fumaric acid and itaconic acid.

As the ethylenically unsaturated monomers which are copolymerized, if desired, with (1) the alkyl methacrylate or acrylate or alkoxy-substituted alkyl methacrylate or acrylate and (2) the epoxy group-containing ethylenically unsaturated monomer or the carboxyl group-containing ethylenically unsaturated monomer, there can be mentioned cyano-substituted alkyl methacrylates or acrylates such as 2-cyanoethyl methacrylate, 2-cyanoethyl acrylate, 2-cyanopropyl methacrylate, 2-cyanopropyl acrylate, 4-cyanobutyl methacrylate and 4-cyanobutyl acrylate; amino-substituted alkyl methacrylates or acrylates such as diethylaminoethyl methacrylate and diethylaminoethyl acrylate; fluorine-containing methacrylates or acrylates such as 1,1,1-trifluoroethyl methacrylate and 1,1,1-trifluoroethyl acrylate; hydroxyl-substituted alkyl methacrylates or acrylates such as hydroxyethyl methacrylate and hydroxyethyl acrylate; alkyl vinyl ketones such as methyl vinyl ketone; vinyl or allyl ethers such as vinyl ethyl ether and allylmethyl ether; vinyl aromatic compounds such as styrene, α-methylstyrene, chlorostyrene and vinyltoluene; vinyl nitriles such as acrylonitrile and methacrylonitrile; vinyl amides such as acrylamide, methacrylamide and N-methylolacrylamide; and ethylene, propylene and vinyl acetate.

The amounts of (1) an alkyl methacrylate or acrylate, or an alkoxy-substituted alkyl methacrylate or acrylate, (2) an epoxy group-containing ethylenically unsaturated monomer and a carboxyl group-containing ethylenically unsaturated monomer, and (3) an optional other ethylenically unsaturated monomer are not particularly limited, but preferably the amounts of (1), (2) and (3) are 35 to 99% by weight, 1 to 15% by weight and 0 to 50% by weight, respectively, and more preferably 60 to 98.5% by weight, 1.5 to 10% by weight and 0 to 30% by weight, respectively.

If the amount of the alkyl methacrylate or acrylate or alkoxy-substituted alkyl methacrylate or acrylate exceeds the above range, the crosslinking effect is lowered. In contrast, the amount of the epoxy group-containing ethylenically unsaturated monomer or the carboxyl group-containing ethylenically unsaturated monomer exceeds the above-range, the rubber elasticity is drastically reduced.

Optimum epoxy group-containing methacrylate or acrylate copolymer rubbers contain at least 2% by weight of units derived from glycidyl methacrylate or glycidyl acrylate as the epoxy groups. Optimum carboxyl group-containing methacrylate or acrylate copolymer rubbers contain at least 2% by weight of units derived from methacrylic acid or acrylic acid as the carboxyl group.

The proportion of the epoxy group-containing methacrylate or acrylate copolymer rubber and the carboxyl group-containing methacrylate or acrylate copolymer rubber is preferably such that the mole number of epoxy groups/the mole number of carboxyl group is in the range of 1/10 to 5/1, more preferably in the range of 1/5 to 3/1. If the epoxy/carboxyl mole ratio is outside this range, the crosslinking density of the epoxy group-containing methacrylate or acrylate copolymer rubber and the carboxyl group-containing methacrylate or acrylate copolymer rubber is low and the stress and the compression set are not improved.

The epoxy group-containing methacrylate or acrylate copolymer rubber and the carboxyl group-containing methacrylate or acrylate copolymer rubber are crosslinked with each other and dispersed in the elastomer composition of the invention. The crosslinking is effected by kneading in the molten state the epoxy group-containing methacrylate or acrylate copolymer rubber and the carboxyl group-containing methacrylate or acrylate rubber together with the thermoplastic copolymer ester elastomer.

The thermoplastic elastomer composition of the invention is prepared by kneading the thermoplastic copolyester elastomer or the thermoplastic copolyamide elastomer, the epoxy group-containing methacrylate or acrylate copolymer rubber and the carboxyl group-containing methacrylate or acrylate copolymer rubber at a temperature higher than the softening point or the melting point. One characteristic of the thermoplastic elastomer composition of the invention lies in that the epoxy group-containing methacrylate or acrylate copolymer rubber and the carboxyl group-containing methacrylate or acrylate copolymer rubber are crosslinked with each other and without using a crosslinking agent under kneading and are dispersed. When the epoxy group-containing methacrylate or acrylate copolymer rubber and the carboxyl group-containing methacrylate or acrylate copolymer rubber are mixed together, care should be taken so as to avoid a premature curing (i.e., scorch) and the mixture should be heated to a temperature sufficiently high for crosslinking the two kinds of the methacrylate or acrylate copolymer rubbers. The kneading is generally carried out at a temperature of 100° to 280° C., preferably 140° to 250° C., for about 1 to 30 minutes.

The composition of the invention may have incorporated therein various additives. The additives include for example a filler, a reinforcer, a single fiber, a pigment, a plasticizer, an antiaging agent, a processing aid and others.

The additives may be added preliminarily to the copolyester elastomer or copolyamide elastomer, the epoxy group-containing methacrylate or acrylate copolymer rubber or the carboxyl group-containing methacrylate or acrylate copolymer rubber, or added under kneading to these components, or added to the prepared elastomer composition. The kneading is preferably carried out under high shearing conditions. As the kneading apparatus used, there can be mentioned, for example, a single screw extruder, a twinscrew extruder, a Buss-co-kneader, a Banbury mixer, a Farrell continuous mixer and a KCK mixer.

The respective components can be added to the kneading apparatus after the components are mixed together, or weighed separately and added simultaneously. A part of or the entire polymers can be added dividedly or sequentially. The procedure by which the elastomer composition is prepared is not particularly limited, but preferably the thermoplastic copolyester or copolyamide elastomer and the two methacrylate or acrylate copolymer rubbers are first dispersed to some extent and then the two kinds of methacrylate or acrylate copolymer rubbers are crosslinked with each other.

The thermoplastic elastomer composition of the invention is advantageous in the following points. The epoxy group-containing methacrylate or acrylate copolymer rubber and the carboxyl group-containing methacrylate or acrylate copolymer rubber are crosslinked with each other and dispersed without deterioration of the copolyester elastomer or copolyamide elastomer and of the resulting elastomer composition, when the thermoplastic copolyester or copolyamide elastomer and the methacrylate or acrylate copolymer rubbers are kneaded together. Therefore, the thermoplastic elastomer composition exhibits a high modulus, a good flexibility, a good heat aging resistance and a good compression set resistance. This is in a striking contrast to a conventional elastomer composition comprising a thermoplastic copolyester elastomer and an uncured acrylic rubber and a conventional elastomer composition comprising a thermoplastic copolyester elastomer and cured by using a conventional crosslinking agent for an acrylic rubber.

Especially, when an epoxy group-containing methacrylate or acrylate copolymer rubber containing at least 2% by weight of glycidyl methacrylate or glycidyl acrylate units as the epoxy group and a carboxyl group-containing methacrylate or acrylate copolymer rubber containing at least 2% by weight of methacrylic acid or acrylic acid units as the carboxyl groups are used, the resulting thermoplastic elastomer composition exhibits a very high modulus and excellent flexibility, heat aging resistance and compression set resistance.

The thermoplastic elastomer composition of the invention will now be specifically described by the following examples.

In the examples, the test of materials was conducted according to Japanese Industrial Standard (JIS) K-6301.

Copolyester Elastomrs

COPE 1: "Lomod XB 125" supplied by General Electric Co.

COPE 2: "Lomod XJ 006" supplied by General Electric Co.

COPE 3: "Hytrel 4056" supplied by Du Pont

COPE 4: "Perprene S2001" supplied by Toyo Spinning Co.

Copoyamide Elastomers

COPA 1: "Pebax 5533SA00" supplied by Atochem Co.

Carboxyl Group-Containing Methacrylate or Acrylate Copolymer Rubber

ACMA 1: Ethyl acrylate (EA)/methacrylaic acid (MA) copolymer rubber; MA content=1.7 parts per hundred parts of rubber (phr), prepared by emulsion polymerization ACMA 2: EA/MA copolymer rubber; MA content=3.5 phr, prepared by emulsion polymerization ACMA 3: EA/MA copolymer rubber; MA content=5.2 phr, prepared by emulsion polymerization Epoxy Group-Containing Methacrylate or Acrylate Copolymer Rubber ACME 1: Ethyl acrylate (EA)/glycidyl methacrylate (GMA) copolymer rubber; GMA content=2.9 phr, prepared by emulsion polymerization ACME 2: EA/GMA copolymer rubber; GMA content=5.7 phr, prepared by emulsion polymerization ACME 3: EA/GMA copolymer rubber; GMA content=8.6 phr, prepared by emulsion polymerization The thermoplastic elastomer compositions of the invention were prepared as follows. A laboplastomill having an inner volume of 600 ml supplied by Toyo Seiki K.K. was heated to 220° C., and charged with a thermoplastic copolyester or copolyamide elastomer and an epoxy group-containing methacrylate or acrylate copolymer rubber. The content was mixed for about 3 minutes and then a carboxyl group-containing methacrylate or acrylate copolymer rubber was added and mixed for 10 minutes. The mixture was withdrawn and shaped into a sheet by rolls preheated to about 180° C. The sheet was compressed to a thickness of 1 mm by a press preheated to 210° C. and blanked by a dumbbell die of JIS No. 1 to obtain dumbbell-shaped samples for evaluating the physical properties. Unless otherwise specified, the thus-prepared samples were used in the following examples and comparative examples.

EXAMPLES 1 TO 12

Thermoplastic elastomer compositions were prepared from thermoplastic copolyester elastomer COPE 1, carboxyl group-containing methacrylate or acrylate copolymer rubbers ACMA 1–ACMA 3 and epoxy group-containing methacrylate or acrylate copolymer rubbers ACME 1–ACME 3 in the proportions shown in Table 1, and the physical properties were evaluated. The results are shown in Table 1.

COMPARATIVE EXAMPLES 1 TO 6

Compositions were prepared from COPE 1 and ACMA 1–ACMA 2 (Comparative Examples 4 and 5) and from COPE 1 and ACME 1–ACME 3 (Comparative Examples 1 to 3) according to the recipes shown in Table 1, and the physical properties thereof were evaluated. A composition prepared from only COPE 1 also was evaluated for its physical properties. The results are shown in Table 1.

TABLE 1

| | | Examples | | | | | | | | |
|---|---|---|---|---|---|---|---|---|---|---|
| | | 1 | 2 | 3 | 4 | 5 | 6 | 7 | 8 | 9 |
| COPE 1 | | 50 | 50 | 50 | 50 | 50 | 50 | 50 | 50 | 100 |
| ACME 1 | | 25 | 25 | 25 | — | — | — | — | — | — |
| ACME 2 | | — | — | — | 25 | 25 | 25 | — | — | — |
| ACME 3 | | — | — | — | — | — | — | 25 | 25 | 25 |
| ACMA 1 | | 25 | — | — | 25 | — | — | 25 | — | — |
| ACMA 2 | | — | 25 | — | — | 25 | — | — | 25 | — |
| ACMA 3 | | — | — | 25 | — | — | 25 | — | — | 25 |
| Original Physical Properties | | | | | | | | | | |
| Hardness | Shore D | 33 | 35 | 34 | 35 | 34 | 36 | 35 | 35 | 35 |
| 100% Modulus | (MPa) | 5.2 | 5.5 | 5.3 | 5.8 | 6.1 | 6.1 | 6.1 | 6.5 | 6.3 |
| Tensile strength | (MPa) | 11.7 | 12.3 | 13.1 | 14.2 | 13.9 | 15.1 | 13.6 | 15.2 | 14.5 |
| Elongation | (%) | 290 | 200 | 320 | 250 | 230 | 240 | 220 | 210 | 210 |
| Elongation set | (%) | 18 | 18 | 20 | 17 | 17 | 18 | 17 | 17 | 19 |

| | | Examples | | | Comparative Examples | | | | | |
|---|---|---|---|---|---|---|---|---|---|---|
| | | 10 | 11 | 12 | 1 | 2 | 3 | 4 | 5 | 6 |
| COPE 1 | | 50 | 50 | 50 | 50 | 50 | 50 | 50 | 50 | 100 |
| ACME 1 | | 35 | 30 | 15 | 50 | — | — | — | — | — |
| ACME 2 | | — | — | — | — | 50 | — | — | — | — |
| ACME 3 | | — | — | — | — | — | 50 | — | — | — |
| ACMA 1 | | 15 | 20 | 35 | — | — | — | 50 | — | — |
| ACMA 2 | | — | — | — | — | — | — | — | 50 | — |
| Original Physical Properties | | | | | | | | | | |
| Hardness | Shore D | 32 | 32 | 31 | 29 | 29 | 29 | 30 | 32 | 49 |
| 100% Modulus | (MPa) | 5.9 | 6.1 | 5.5 | 4.4 | 4.4 | 4.5 | 5.0 | 5.0 | 12.3 |
| Tensile strength | (MPa) | 14.6 | 14.7 | 10.2 | 9.6 | 9.9 | 10.9 | 5.7 | 5.9 | 16.8 |
| Elongation | (%) | 250 | 230 | 240 | 700 | 600 | 580 | 240 | 300 | 440 |
| Elongation set | (%) | 17 | 17 | 19 | 26 | 24 | 24 | Broken | 33 | 30 |

As seen from Table 1, the compositions of the invention have a high modulus and a low elongation and exhibit a good rubber elasticity. Especially, these characteristics are developed prominently where the contents of the carboxyl group and the epoxy group are high.

Where the compositions contain COPE 1 and only one of the ACME 1, ACME 2, ACME 3, ACMA 1 and ACMA 2 (Comparative Examples 1–5), the modulus and the tensile strength are lower than those of the invention and the elongation set is larger than that of the invention. These comparative compositions clearly have a rubber elasticity inferior to that of the invention.

Namely, where both of the epoxy group-containing methacrylate or acrylate copolymer rubber and the carboxyl group-containing methacrylate or acrylate rubber are contained in the thermoplastic elastomer compositions, the compositions exhibit rubber elasticity superior to that of the compositions containing one of the epoxy group-containing methacrylate or acrylate copolymer rubber and the carboxyl group-containing methacrylate or acrylate copolymer rubber. In the course of preparing the composition of the invention, when the epoxy group-containing methacrylate or acrylate copolymer rubber and the carboxyl group-containing methacrylate or acrylate copolymer rubber were mixed together in the laboplastomill, an increase of the torque was observed, and thus, it was proved that a crosslinking reaction occurred between the two methacrylate or acrylate rubbers.

In the compositions of the invention, even when the proportion of the epoxy group-containing methacrylate or acrylate copolymer rubber to the carboxyl group-containing methacrylate or acrylate copolymer rubber is varied as shown in Examples 10 to 12, the intended high stress and tensile strength and low elongation set can be obtained. Further, even when the contents of the epoxy group and/or the carboxyl group in the respective methacrylate or acrylate copolymer rubbers as shown in Examples 1 to 9, a good rubber elasticity can be obtained.

EXAMPLES 13 TO 15 AND COMPARATIVE EXAMPLE 7

Compositions were prepared from COPE 1, ACME 2 and ACMA 2 according to the recipes shown in Table 1, and the physical properties thereof were evaluated. The results are shown in Table 2.

As seen from Examples 13 to 15, when the ratio of COPE 1 to the sum of ACME 2 and ACMA 2 was in the range of 80:20 to 40:60, a high stress, a high tensile strength and a low elongation set could be obtained. As seen from Comparative Example 7, when the ratio of COPE 1 to the sum of ACME 2 and ACMA 2 was 20:80, these desired properties could not be obtained. In the test for elongation set at 100% elongation, the samples were broken, and thus, this test could not be completed.

Further, samples of Comparative Example 7 were inferior to those of Example 15 with regard to the fluidity upon pressshaping, surface texture and proccessability.

TABLE 2

|  |  | Examples | | | Comp. Ex. |
| --- | --- | --- | --- | --- | --- |
|  |  | 13 | 14 | 15 | 7 |
| COPE 1 |  | 80 | 60 | 40 | 20 |
| ACME 2 |  | 10 | 20 | 30 | 40 |
| ACMA 2 |  | 10 | 20 | 30 | 40 |
| Original Physical Properties |  |  |  |  |  |
| Hardness | Shore D | 45 | 38 | 31 | 21 |
| 100% Modulus | (MPa) | 9.5 | 6.6 | 4.3 | 3.3 |
| Tensile strength | (MPa) | 16.2 | 15.0 | 12.1 | 8.2 |
| Elongation | (%) | 310 | 270 | 210 | 100 |
| Elongation set | (%) | 27 | 20 | 14 | — |

EXAMPLE 16, COMPARATIVE EXAMPLES 8 TO 10

A composition of the invention (Example 16) was prepared from COPE 2, ACME 2 and ACMA 2 according to the recipe shown in Table 3. For comparison, compositions composed of COPE 2 and one of ACME 2 and ACMA 2 (Comparative Example 8, 9) and a composition composed only of COPE 2 (Comparative Example 10) were prepared according to the recipes shown in Table 3. The properties thereof were evaluated. The results are shown in Table 3.

TABLE 3

|  | Example | Comparative Examples | | |
| --- | --- | --- | --- | --- |
|  | 16 | 8 | 9 | 10 |
| COPE 2 | 50 | 50 | 50 | 100 |
| ACME 2 | 25 | 50 | — | — |
| ACMA 2 | 25 | — | 50 | — |

TABLE 3-continued

|  |  | Example | Comparative Examples | | |
| --- | --- | --- | --- | --- | --- |
|  |  | 16 | 8 | 9 | 10 |
| Original Physical Properties |  |  |  |  |  |
| Hardness | Shore D | 75 | 70 | 73 | 91 |
| 100% Modulus | (MPa) | 4.3 | 2.9 | 1.9 | 7.5 |
| Tensile strength | (MPa) | 13.2 | 9.7 | 5.6 | 17.6 |
| Elongation | (%) | 230 | 410 | 270 | 810 |
| Elongation set | (%) | 11 | 16 | 21 | 22 |
| Compression set (100° C. × 22 Hr) |  |  |  |  |  |
| Compression set | (%) | 45 | 66 | 78 | 83 |
| Resistance to heat aging in air (150° C. × 7 days) |  |  |  |  |  |
| Retention of elongation | (%) | 26 | 5 | 0* | 0* |
| Oil resistance (JIS No. 3 oil, 100° C. × 7 days) |  |  |  |  |  |
| Volume change | (%) | 20.6 | 24.1 | 25.0 | 29.8 |

Note
*sample was broken.

The composition of the invention (Example 16) exhibited a high modulus, a high tensile strength, a low elongation set, a reduced compression set, a good resistance to heat aging in air and a good oil resistance. In contrast, when COPE 2 was incorporated with only one of ACME 2 and ACMA 2 (Comparative Examples 8, 9), the resulting compositions did not exhibit the beneficial results of the invention.

EXAMPLE 17 TO 19

Compositions of the invention were prepared from one of COPE 3, COPE 4 and COPA 1, and from ACME 2 and ACMA 2 according to the recipes shown in Table 4, and the properties thereof were evaluated. The results are shown in Table 4.

TABLE 4

|  |  | Examples | | |
| --- | --- | --- | --- | --- |
|  |  | 17 | 18 | 19 |
| COPE 3 |  | 50 | — | — |
| COPE 4 |  | — | 50 | — |
| COPA 1 |  | — | — | 50 |
| ACME 2 |  | 20 | 20 | 20 |
| ACMA 2 |  | 30 | 30 | 30 |
| Original Physical Properties |  |  |  |  |
| Hardness | Shore D | 79 | 83 | 88 |
| 100% Modulus | (MPa) | 4.2 | 7.6 | 7.4 |
| Tensile strength | (MPa) | 15.6 | 16.5 | 15.7 |
| Elongation | (%) | 300 | 220 | 200 |
| Elongation set | (%) | 15 | 19 | 22 |

As seen from Examples 17 to 19, although the properties of the compositions of the invention vary depending upon the particular COPE and COPA used, these compositions exhibited a high modulus, a tensile strength and a low elongation set, and thus, have a good rubber elasticity.

Industrial Applicability

Rubber articles made from the thermoplastic elastomer composition of the invention are flexible and have a high modulus, a good heat aging resistance and a good compression set resistance. Therefore, the rubber articles that can be used have various uses which include industrial parts, mineral parts, construction parts, automobile parts, electrical and electronic parts and sport goods. Especially, the rubber articles are valuable as automobile hoses and tubes such as a fuel hose, an oil hose, a power steering hose, a brake lose and water hose; hoses and tubes of various industrial and mineral machines such as a hydraulic pressure hose, an air hose, a water hose and a chemicals-transporting hose; various seals such as an O-ring, a packing, gaskets and oil seals; diaphragms; belts such as a plain belt, a V-belt and a geared belt; bellow type boots such as a uniformly moving joint boot and a dust cover boot; interior and exterior automobile trims such as a bumper, aero-parts, a front fender and a mat-guard; various rolls; and linings for various machines.

We claim:

1. A thermoplastic elastomer composition comprising:
   (A) a thermoplastic copolyester elastomer or a thermoplastic copolyamide elastomer,
   (B) a methacrylate or acrylate copolymer rubber containing an epoxy group, and
   (C) a methacrylate or acrylate copolymer rubber containing a carboxyl group;
   the amount of component (A) being 30 to 90% by weight, the total amount of component (B) and component (C) being 10 to 70% by weight, and the proportion of component (B) to component (C) being such that the ratio of epoxy group in component (B)/carboxyl group in component (C) is in the range of 1/10 to 5/1 by mole;
   said epoxy group-containing methacrylate or acrylate copolymer rubber and said carboxyl group-containing methacrylate or acrylate copolymer rubber being comprised of:
   35 to 994 by weight of alkyl methacrylate or acrylate units or alkoxy-substituted alkyl methacrylate or acrylate units,
   1 to 154 by weight of epoxy group-containing ethylenically unsaturated monomer units or carboxyl group-containing ethylenically unsaturated monomer units, and
   0 to 15% by weight of other copolymerizable ethylenically unsaturated monomer units; and
   component (B) and component (C) having been crosslinked with each other under kneading without using a crosslinking agent.

2. A thermoplastic elastomer composition as claimed in claim 1 wherein said thermoplastic copolyester elastomer is at least one member selected from the group consisting of a copolyetherester elastomer, a polylactone-modified or lactone-modified copolyetherester elastomer and a copolyetherimideester elastomer.

3. A thermoplastic elastomer composition as claimed in claim 1 wherein said thermoplastic copolyamide elastomer is at least one member selected from the group consisting of a copolyetheresteramide elastomer and a copolyesteramide elastomer.

4. A thermoplastic elastomer composition as claimed in any one of claims 1 to 3 wherein said epoxy group-containing methacrylate or acrylate copolymer rubber contains, as the epoxy group, at least 2% by weight of units derived from at least one monomer containing an epoxy group selected from the group consisting of glycidyl methacrylate, glycidyl acrylate and allyl glycidyl ether.

5. A thermoplastic elastomer composition as claimed in any one of claims 1 to 3 wherein said carboxyl group-containing methacrylate or acrylate copolymer rubber is a methacrylate or acrylate copolymer rubber containing, as the carboxyl group, at least 2% by weight of units derived from methacrylic acid or acrylic acid.

6. A thermoplastic elastomer composition as claimed in claim 1 wherein said epoxy group-containing methacrylate or acrylate copolymer rubber and said carboxyl group-containing methacrylate or acrylate copolymer rubber are mixed together with the thermoplastic copolyester elastomer or thermoplastic copolyamide elastomer and are crosslinked with each other in a molten state.

7. A thermoplastic elastomer composition as claimed in claim 1 wherein the proportion of component (B) to component (C) is such that the ratio of epoxy group in component (B)/carboxyl group in component (C) is in the range of 1/5 to 3/1.

* * * * *

UNITED STATES PATENT AND TRADEMARK OFFICE
CERTIFICATE OF CORRECTION

PATENT NO.: 5,541,258
DATED : July 30, 1996
INVENTOR(S): Mitsuyoshi AONUMA et al It is certified that error appears in the above-identified patent and that said Letters Patent is hereby corrected as shown below:

On the title page: ITEM [63]

, under "RELATED U.S. APPLICATION DATA", delete "Jul. 7, 1992" and insert therefor --July 17, 1992--.

Signed and Sealed this

Tenth Day of December, 1996

Attest:

BRUCE LEHMAN

Attesting Officer

Commissioner of Patents and Trademarks